2,791,485

PROCESS FOR REMOVAL OF HAFNIUM FROM ZIRCONIUM-CONTAINING MATERIAL

Ivan Edgar Newnham, North Balwyn, Australia, assignor to Commonwealth Scientific and Industrial Research Organization, East Melbourne, Australia, a body corporate No Drawing. Application June 8, 1953,
Serial No. 360,320

Claims priority, application Australia December 3, 1952

8 Claims. (Cl. 23—16)

The present invention relates to the removal of hafnium from zirconium-containing materials, which may be either zirconium or its compounds, and its objects are, first, to effect such removal by direct chemical means as distinct from the physico-chemical methods, such as fractional distillation, fractional precipitation, fractional crystallisation or ion-exchange processes, at present in use, and, second, to produce zirconium which has such a low hafnium content that it can be regarded as being virtually hafnium-free.

All known sources of zirconium contain hafnium in quantities which vary from less than 1% to more than 20%. The chief source of zirconium in Australia is the mineral zircon which contains about 1.5% hafnium. In any of the normal methods employed for recovering the zirconium from its ores the associated hafnium is not separated from the zirconium, owing to the almost identical chemical properties of these elements and their respective compounds. Elaborate processes based on slight differences in the solubility of, for example, the phosphates of the two elements, or else the more recent ion-exchange methods, are necessary to separate the hafnium and zirconium.

The present inventor has now found that there is a marked difference in the chemical reducibility of tetrahalides of zirconium and hafnium. This difference of reducibility forms the basis of this invention, according to which hafnium is removed from the zirconium-containing material by converting the zirconium component and the associated hafnium component, by any known procedure, into tetrahalides, and then reducing the zirconium tetrahalide to one or more lower halides or even to metallic zirconium, while the hafnium tetrahalide remains unchanged or substantially so, the hafnium tetrahalide and any unreduced zirconium tetrahalide being then separated from the zirconium reduction product.

It is of considerable practical importance, although not essential, to effect the reduction of the zirconium tetrahalide by heating the tetrahalides of zirconium and hafnium in an inert atmosphere (i. e. in an atmosphere of argon or other inert gas or in vacuo) with zirconium dihalide, which normally will be produced in the first instance by treatment of a batch of tetrahalides of zirconium and hafnium with finely sub-divided metallic zirconium.

Alternatively, the reductions could be achieved by using finely sub-divided magnesium, aluminium, zinc or other substance of sufficient oxidation-reduction potential, in place of zirconium dihalide but the latter has the advantage that it may be used repeatedly, as hereinafter explained, as the reducing agent for treatment of successive batches of the said tetrahalides, and it also has the advantage that the resultant zirconium tetrahalide is not contaminated with chloride of magnesium, aluminium or zinc.

This reduction of the zirconium tetrahalide is carried out until the zirconium tetrahalide is reduced to the trihalide or dihalide or even to the metallic state, while the hafnium tetrahalide remains unreduced (or virtually so), and then the hafnium tetrahalide is separated from the zirconium reduction product. Preferably, this separation is effected by sublimation in vacuo of the hafnium tetrahalide (and any unreduced zirconium tetrahalide) from the comparatively involatile reduced halides (i. e., the trihalides and dihalides of zirconium), and metallic zirconium if present in the product, as that can be carried out readily. The reduced halides may then be dissolved in water or dilute mineral acid. In this way solutions of zirconium oxyhalides containing less than 0.1% hafnium can be obtained. Preferably, however, the reduced halides are converted into zirconium tetrahalide and zirconium dihalide or even metallic zirconium by heating in argon or other inert gas until disproportionation of the trihalide is complete or virtually so.

The zirconium obtainable by this process contains so little hafnium that it may be termed "hafnium-free."

It is not essential in practice for the reduction to be carried exactly to the point of reduction of all the zirconium tetrahalide although, naturally, it is desirable to avoid loss of zirconium. Obviously, reduction of hafnium tetrahalide by over-heating should be avoided. The most suitable range of temperature depends upon the halide used and the reducing agent employed; for example, in the case of the reduction of the tetrachloride by zirconium the temperature may be as high as 500° C., but in the case of its reduction by zinc a temperature of 350° C. would be excessive. The duration of the treatment depends upon the temperature and the nature of the reducing agent but is usually complete within an hour.

As above-mentioned, instead of carrying out the reduction of zirconium tetrahalide, and the disproportionation of reduced halide, in an atmosphere of argon or other inert gas it may be carried out in vacuo but it is difficult to carry out these reactions in vacuo at the temperatures necessary such as 400° C. and higher (as, for example, at 430° C.); the design problems are more difficult and the necessary apparatus is expensive.

When zirconium dihalide is used as the reducing agent it may be used repeatedly for the treatment of successive batches, as above-mentioned. The dihalide reacts with the tetrahalide of zirconium and produces the trihalide which in turn disproportionates into zirconium tetrahalide and zirconium dihalide, so that the process can be carried out repeatedly with the addition of fresh batches of the mixed tetrahalides and the removal of hafnium tetrahalide and zirconium tetrahalide which are sublimed in two stages. As above-mentioned, the hafnium tetrahalide sublimate will contain any zirconium tetrahalide which is unreduced at the stage at which hafnium tetrahalide is sublimed off.

While this invention extends to the use of tetrahalides of zirconium and hafnium other than tetrachlorides it will be less expensive and normally more practicable to use the tetrachlorides of those metals.

The chlorides may be formed by converting crude zircon to the carbides (as, for example, in a graphite resistor furnace) and by chlorinating the carbides (as, for example, with chlorine in a Monel metal vessel). The conversion of crude $ZrCl_4$ ($HfCl_4$) to $ZrCl_3$ ($HfCl_4$), the subliming off of the $HfCl_4$, and the disproportionating of the $ZrCl_3$ to $ZrCl_4$ and $ZrCl_2$, may be carried out in a stainless steel vessel. Zirconium may be obtained from the $ZrCl_4$ by reduction with magnesium in a stainless steel vessel, followed by vacuum distillation of $MgCl_2$ and excess magnesium from the zirconium sponge in a heat-resistant vessel. The zirconium sponge may then be melted in a graphite resistor furnace to form ingots of zirconium.

The process according to this invention enables a very simple procedure to be followed, which, subject to the periodic insertion of fresh batches of the mixed tetrahalides and the raising of the temperature of the furnace, is a semi-continuous process.

This procedure comprises forming the tetrahalides of zirconium and hafnium and subliming them on to cooled coils of a removable lid or on to some other condenser member of a reaction chamber, transferring this lid or said other member to another reaction chamber where the tetrahalides volatilise and come into contact with zirconium dihalide (or at the commencement of the procedure with metallic zirconium) the zirconium tetrahalide being reduced, the hafnium tetrahalide being then removed by vacuum pumps or otherwise from the reaction vessel, and the zirconium tetrahalide being reformed at a higher temperature and being then recondensed on the condenser member. The condenser member is then removed and replaced by one bearing a fresh batch of the mixed tetrahalides, and the zirconium tetrahalide condensed on the first-mentioned condenser member may be converted to metallic zirconium, and so on.

While halides other than chlorides could be used if desired, the use of the chlorides is preferred, as above-mentioned.

Hafnium tetrachloride will sublime off in vacuo at temperatures above 180° C. and the rate of sublimation increases with the temperature but, as disproportionation of the zirconium trichloride commences at about 330° C., the sublimation of the hafnium tetrachloride should be effected at a temperature well below that (as, for example, at 300° C. or lower).

Preferably, the disproportionation of the zirconium trichloride is effected at about 450° C. and the zirconium tetrachloride formed is in the gaseous state as it is volatile at 330° C. at atmospheric pressure.

The reactions involved are believed to be as follows:

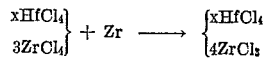

The $HfCl_4$ sublimes off at the temperatures above-mentioned and when it has all passed out from the reaction chamber the temperature of the latter is raised to about 450° C. and the $ZrCl_3$ then disproportionates according to the left-to-right direction of the following reversible reaction:

The gaseous $ZrCl_4$ condenses on the cooled coils or other condenser member above-mentioned and is removed therewith, while a residue of involatile $ZrCl_2$ remains in the reaction vessel and reacts with the next batch of mixed tetrahalides (instead of using more metallic zirconium) according to the right-to-left direction of the reaction.

By the terms "sublimation" and "sublime" as used throughout the specification and in the hereto appended claims, it is intended to mean the conversion of a substance from the solid state to the gaseous state and back into the solid state without it appearing at any time in the liquid state, the direct conversion of solid to vapor, or the direct conversion of vapor to solid. This definition is taken from the condensed Chemical Dictionary, fourth edition, published by the Reinhold Publishing Corporation in 1950.

I claim:

1. A process for removing hafnium from zirconium-containing material, comprising the conversion of the zirconium component and the associated hafnium component into tetrahalides, followed by the reduction of the tetrahalide of zirconium to at least lower halides while the hafnium tetrahalide remains unchanged, and the separation of the unchanged hafnium tetrahalide from the reduced zirconium compound by sublimation of the hafnium tetrahalide.

2. In a process for removing hafnium from zirconium-containing material as claimed in claim 1, the dissolving of the reduced halides of zirconium in water after the unchanged hafnium tetrahalide has been separated from the reduced halides of zirconium by sublimation of the hafnium tetrahalide.

3. In a process for removing hafnium from zirconium-containing material as claimed in claim 1, the dissolving of the reduced halides of zirconium in mineral acid after the unchanged hafnium tetrahalide has been separated from the reduced halides of zirconium by sublimation of the hafnium tetrahalide.

4. In a process for removing hafnium from zirconium-containing material as claimed in claim 1, the conversion of the reduced halides of zirconium to metallic zirconium and zirconium tetrahalide by heating in an inert atmosphere until disproportionation is virtually complete.

5. A process for removing hafnium from zirconium-containing material, comprising the conversion of the zirconium component and the associated hafnium component into tetrahalides, followed by the heating of said tetrahalides in an inert atmosphere with zirconium dihalide to produce zirconium trihalide, the subliming off of the hafnium tetrahalide and the disproportionating of the zirconium trihalide to form zirconium tetrahalide, which is then sublimed off, and a residue of involatile zirconium dihalide which is used for the treatment of another batch of the mixed tetrahalides.

6. A process for removing hafnium from zirconium-containing material, comprising the conversion of the zirconium component and the associated hafnium component into tetrahalides, followed by the heating of said tetrahalides in an inert atmosphere with zirconium dihalide to produce zirconium trihalide, the subliming off of the hafnium tetrahalide and the disproportionating of the zirconium trihalide to form zirconium tetrahalide, which is then sublimed off, and a residue of involatile zirconium dihalide which is used for the treatment of another batch of the mixed tetrahalides, the zirconium dihalide being produced initially by reducing zirconium tetrahalide in a batch of the tetrahalides of zirconium and hafnium by treatment with metallic zirconium.

7. A process for removing hafnium from zirconium-containing material, comprising forming the tetrahalides of zirconium and hafnium and subliming them on to a condenser member of a reaction chamber, transferring this condenser member to another reaction chamber where the tetrahalides are volatilised and come into contact with zirconium dihalide, the zirconium tetrahalide being reduced, the hafnium tetrahalide subliming off, and the birconium tetrahalide being reformed at a higher temperature and being then sublimed off.

8. A process according to claim 1, in which the tetrahalides formed at the commencement of the process are tetrachlorides.

References Cited in the file of this patent

UNITED STATES PATENTS 2,618,531   Lindblad et al. _____ Nov. 18, 1952

OTHER REFERENCES

Mellor: Comprehensive Treatise on Inorganic and Theoretical Chemistry, vol. 7, pages 143 and 166–169 (1927.) Published by Longmans, Green and Co., London.